United States Patent
Zuo (10) Patent No.: US 10,627,678 B2
(45) Date of Patent: Apr. 21, 2020

(54) DISPLAY APPARATUS HAVING TRANSPARENT MAGNETIC LAYER, AND FABRICATING METHOD THEREOF

(71) Applicants: BOE Technology Group Co., Ltd., Beijing (CN); Chengdu BOE Optoelectronics Technology Co., Ltd., Chengdu, Sichuan (CN)

(72) Inventor: Xiongcan Zuo, Beijing (CN)

(73) Assignees: BOE Technology Group Co., Ltd., Beijing (CN); Chengdu BOE Optoelectronics Technology Co., Ltd., Chengdu, Sichuan (CN)

( * ) Notice: Subject to any disclaimer, the term of this patent is extended or adjusted under 35 U.S.C. 154(b) by 0 days.

(21) Appl. No.: 16/099,413

(22) PCT Filed: Dec. 13, 2017

(86) PCT No.: PCT/CN2017/115917
§ 371 (c)(1),
(2) Date: Nov. 6, 2018

(87) PCT Pub. No.: WO2019/113832
PCT Pub. Date: Jun. 20, 2019

(65) Prior Publication Data
US 2019/0179182 A1   Jun. 13, 2019

(51) Int. Cl.
*G02F 1/1339* (2006.01)
*G02F 1/1333* (2006.01)
(Continued)

(52) U.S. Cl.
CPC ........ *G02F 1/1339* (2013.01); *G02F 1/13338* (2013.01); *G02F 1/13394* (2013.01);
(Continued)

(58) Field of Classification Search
CPC ............... G02F 1/1339; G02F 1/13338; G02F 1/13394; G02F 2001/13398; G02F 2202/07; G06F 3/041; H01F 7/0252; H01F 1/047
See application file for complete search history.

(56) References Cited

U.S. PATENT DOCUMENTS

| | | | |
|---|---|---|---|
| 6,369,806 | B1 | 4/2002 | Endo et al. |
| 2004/0150614 | A1 | 8/2004 | Seo |

(Continued)

FOREIGN PATENT DOCUMENTS

| | | |
|---|---|---|
| CN | 101676775 A | 3/2010 |
| CN | 102654671 A | 9/2012 |

(Continued)

OTHER PUBLICATIONS

Kobayashi (Kobayashi, N. et al., Optically Transparent Ferromagnetic Nanogranular Films with Tunable Transmittance. Sci. Rep. 6, 34227; doi:10.1038/srep34227 (2016), accessed from web on Nov. 2, 2019) (Year: 2016).*

(Continued)

*Primary Examiner* — Mark Edwards
(74) *Attorney, Agent, or Firm* — Intellectual Valley Law, P.C.

(57) ABSTRACT

The present application discloses a display apparatus. The display apparatus includes a display module including a first display substrate and a second display substrate facing the first display substrate; and a first substantially transparent magnetic layer and a second substantially transparent magnetic layer both of which on a side of the second display substrate distal to the first display substrate and spaced apart from each other. The first substantially transparent magnetic layer and the second substantially transparent magnetic layer are configured to face each other with their sides having a (Continued)

same magnetic polarity to generate a mutually repulsive force between each other.

16 Claims, 4 Drawing Sheets

(51) Int. Cl.
    *G06F 3/041*     (2006.01)
    *H01F 7/02*     (2006.01)
    *H01F 1/047*     (2006.01)

(52) U.S. Cl.
    CPC .......... *G06F 3/041* (2013.01); *H01F 7/0252* (2013.01); *G02F 2001/13398* (2013.01); *G02F 2202/07* (2013.01); *H01F 1/047* (2013.01)

(56) References Cited

U.S. PATENT DOCUMENTS

| | | | |
|---|---|---|---|
| 2011/0114991 A1* | 5/2011 | Lee | H01L 51/5246 257/100 |
| 2014/0176883 A1* | 6/2014 | Zuo | G02F 1/1333 349/106 |
| 2015/0346544 A1 | 12/2015 | Wu et al. | |
| 2016/0018694 A1* | 1/2016 | Zhou | G02F 1/13394 349/106 |
| 2016/0104560 A1* | 4/2016 | Ohkoshi | C01G 49/06 252/62.59 |
| 2017/0153732 A1* | 6/2017 | Choi | G02B 5/3025 |
| 2017/0192287 A1 | 7/2017 | Zhang et al. | |
| 2018/0186119 A1 | 7/2018 | Yang et al. | |

FOREIGN PATENT DOCUMENTS

| | | |
|---|---|---|
| CN | 103792722 A | 5/2014 |
| CN | 104020594 A | 9/2014 |
| CN | 105607323 A | 5/2016 |
| CN | 105741682 A | 7/2016 |
| JP | S60118824 A | 6/1985 |

OTHER PUBLICATIONS

International Search Report & Written Opinion dated Sep. 12, 2018, regarding PCT/CN2017/115917.

Optically Transparent Ferromagnetic Nanogranular Films with Tunable Transmittance, Nobukiyo Kobayashi et.al., Nature, Scientific Reports (Published Sep. 28, 2016), | 6:34227 | DOI: 10.1038/srep34227.

First Office Action in the Chinese Patent Application No. 201780002015.3, dated Feb. 27, 2020; English translation attached.

\* cited by examiner

DISPLAY APPARATUS HAVING TRANSPARENT MAGNETIC LAYER, AND FABRICATING METHOD THEREOF

CROSS-REFERENCE TO RELATED APPLICATION

This application is a national stage application under 35 U.S.C. § 371 of International Application No. PCT/CN2017/115917, filed Dec. 13, 2017, the contents of which are incorporated by reference in the entirety.

TECHNICAL FIELD

The present invention relates to display technology, more particularly, to a display apparatus having a transparent magnetic layer, and a fabricating method thereof.

BACKGROUND

A liquid crystal display apparatus includes an array substrate and a color filter substrate assembled together, and a liquid crystal layer between the array substrate and the color filter substrate. The liquid crystal layer includes liquid crystal molecules. A liquid crystal display device produces an image by applying an electric field to a liquid crystal layer between the array substrate and the color filter substrate. In response to the electric field applied to the liquid crystal layer, the liquid crystal molecules in the liquid crystal layer rotate. Thus, the electric field changes an alignment direction of the liquid crystal molecules in the liquid crystal layer. Light transmittance of the liquid crystal layer is adjusted when the alignment direction of the liquid crystal molecules changes.

SUMMARY

In one aspect, the present invention provides a display apparatus comprising a display module comprising a first display substrate and a second display substrate facing the first display substrate; and a first substantially transparent magnetic layer and a second substantially transparent magnetic layer both of which on a side of the second display substrate distal to the first display substrate and spaced apart from each other; wherein the first substantially transparent magnetic layer and the second substantially transparent magnetic layer are configured to face each other with their sides having a same magnetic polarity to generate a mutually repulsive force between each other.

Optionally, the first substantially transparent magnetic layer is on a side of the second substantially transparent magnetic layer distal to the second display substrate; and the second substantially transparent magnetic layer is configured to repel the first substantially transparent magnetic layer when a pressure is applied on the first substantially transparent magnetic layer along a direction from the first substantially transparent magnetic layer toward the second substantially transparent magnetic layer, thereby reducing deformation in the second display substrate due to the pressure applied on the first substantially transparent magnetic layer.

Optionally, the display apparatus further comprises a touch panel on a side of the second display substrate distal to the first display substrate.

Optionally, the second substantially transparent magnetic layer is configured to repel the first substantially transparent magnetic layer when a pressure is applied on the touch panel along a direction from the touch panel toward the display module, thereby reducing deformation in the second display substrate due to the pressure applied on the touch panel.

Optionally, the first substantially transparent magnetic layer and the second substantially transparent magnetic layer are spaced apart by at least one layer of the touch panel.

Optionally, the touch panel comprises a base substrate; the first substantially transparent magnetic layer is on a side of the base substrate proximal to the second display substrate; and the second substantially transparent magnetic layer is on a side of the second display substrate proximal to the touch panel.

Optionally, the touch panel further comprises a touch electrode layer on the base substrate; and the first substantially transparent magnetic layer is on a side the touch electrode layer proximal to the base substrate.

Optionally, the touch panel further comprises a touch electrode layer on the base substrate; and the first substantially transparent magnetic layer is on a side the touch electrode layer distal to the base substrate.

Optionally, the touch panel comprises a base substrate; the first substantially transparent magnetic layer is on a side of the base substrate distal to the second display substrate; and the second substantially transparent magnetic layer is on a side of the second display substrate proximal to the touch panel.

Optionally, the display apparatus is a liquid crystal display apparatus; and the display module is a liquid crystal display module comprising the first display substrate, the second display substrate, and a liquid crystal layer between the first display substrate and the second display substrate.

Optionally, at least one of the first substantially transparent magnetic layer and the second substantially transparent magnetic layer is a substantially transparent magnetic layer comprising magnetic nano-particles dispersed in a substantially transparent insulating material matrix.

Optionally, the substantially transparent magnetic layer comprises ferromagnetic nano-particles dispersed in a substantially transparent fluoride compound matrix.

Optionally, the ferromagnetic nano-particles comprises iron-cobalt alloy of nanometer-sized granules.

Optionally, the transparent insulating material matrix comprises aluminum fluoride.

Optionally, the magnetic nano-particles have an average diameter in a range of approximately 10 nm to approximately 20 nm.

Optionally, magnetization of the substantially transparent magnetic layer is at least 15 kA/m.

Optionally, the substantially transparent magnetic layer has a transmittance for visible light greater than 80%.

Optionally, the display apparatus further comprises a third magnetic layer on a side of the first display substrate proximal to the second display substrate; and a fourth magnetic layer on a side of the second display substrate proximal to the first display substrate, and spaced apart from the third magnetic layer; wherein the third magnetic layer and the fourth magnetic layer are configured to face each other with their sides having a same magnetic polarity to generate a mutually repulsive force between each other.

Optionally, the display module further comprises a spacer layer spacing apart the first display substrate and the second display substrate; the spacer layer comprises a plurality of subsidiary spacers; the third magnetic layer is on a side of the first display substrate proximal to the second display substrate; and the fourth magnetic layer is on a side of the plurality of subsidiary spacers distal to the second display substrate and proximal to the first display substrate.

Optionally, the display module further comprises a spacer layer spacing apart the first display substrate and the second display substrate; the spacer layer comprises a plurality of subsidiary spacers; the third magnetic layer is on a side of the plurality of subsidiary spacers distal to the first display substrate and proximal to the second display substrate; and the fourth magnetic layer is on a side of the second display substrate proximal to the first display substrate.

In another aspect, the present invention provides a display apparatus comprising a display module comprising a first display substrate, a second display substrate facing the first display substrate, and a spacer layer spacing apart the first display substrate and the second display substrate; a thud magnetic layer on a side of the first display substrate proximal to the second display substrate; and a fourth magnetic layer on a side of the second display substrate proximal to the first display substrate, and spaced apart from the third magnetic layer; wherein the third magnetic layer and the fourth magnetic layer are configured to face each other with their sides having a same magnetic polarity to generate a mutually repulsive force between each other; the spacer layer comprises a plurality of subsidiary spacers; the third magnetic layer is on a side of the plurality of subsidiary spacers distal to the first display substrate and proximal to the second display substrate; and the fourth magnetic layer is on a side of the second display substrate proximal to the first display substrate.

In another aspect, the present invention provides a method of fabricating a display apparatus, comprising forming display module comprising a first display substrate and a second display substrate facing the first display substrate; forming a first substantially transparent magnetic layer; and forming a second substantially transparent magnetic layer; wherein both of the first substantially transparent magnetic layer and the second substantially transparent magnetic layer are formed on a side of the second display substrate distal to the first display substrate and formed to be spaced apart from each other; and the first substantially transparent magnetic layer and the second substantially transparent magnetic layer are formed to face each other with their sides having a same magnetic polarity to generate a mutually repulsive force between each other.

Optionally, the method further comprises forming a touch panel on a side of the second display substrate distal to the first display substrate; the touch panel is formed on a base substrate; wherein forming the first substantially transparent magnetic layer comprises magneton sputtering a magnetic material on the base substrate; and forming the second substantially transparent magnetic layer comprises magneton sputtering a magnetic material on a surface of the second display substrate on a side distal to the first display substrate.

Optionally, the display apparatus is a liquid crystal display apparatus; and forming the display module further comprises forming a liquid crystal layer between the first display substrate and the second display substrate.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional liquid crystal display apparatuses t typically include an array substrate, a counter substrate facing the array substrate, and a liquid crystal layer sandwiched between the array substrate and the counter substrate. When the surface of the counter substrate is pressed upon, the counter substrate undergoes deformation in response to the pressure applied on the surface of the counter substrate. When the deformation reaches a certain magnitude, it causes the liquid crystal molecules in the liquid crystal layer to dissipate from the pressing location to its surroundings, resulting in pooling effects in the display apparatus and affecting display quality. In particular, when the liquid crystal display apparatus is a touch control liquid crystal display apparatus, the frequent touch actions on the display apparatus severely affect viewing experience. When the touch control liquid crystal display apparatus includes a touch panel on the display module, and particularly when the touch panel is made ultra-thin, the pooling effects become even more problematic.

Accordingly, the present disclosure provides, inter alia, a display apparatus having a transparent magnetic layer, and a fabricating method thereof that substantially obviate one or more of the problems due to limitations and disadvantages of the related art. In one aspect, the present disclosure provides a display apparatus. In some embodiments, the display apparatus includes a display module having a first display substrate and a second display substrate facing the first display substrate; a first substantially transparent magnetic layer and a second substantially transparent magnetic layer both of which on a side of the second display substrate distal to the first display substrate and spaced apart from each other. Optionally, the first substantially transparent magnetic layer and the second substantially transparent magnetic layer are configured to face each other with their sides having a same magnetic polarity to generate a mutually repulsive force between each other. As used herein, the term "substantially transparent" mean at least 50 percent (e.g., at least 60 percent, at least 70 percent, at least 80 percent, at least 90 percent, and at least 95 percent) of light in the visible wavelength range transmitted therethrough.

Figure 1:
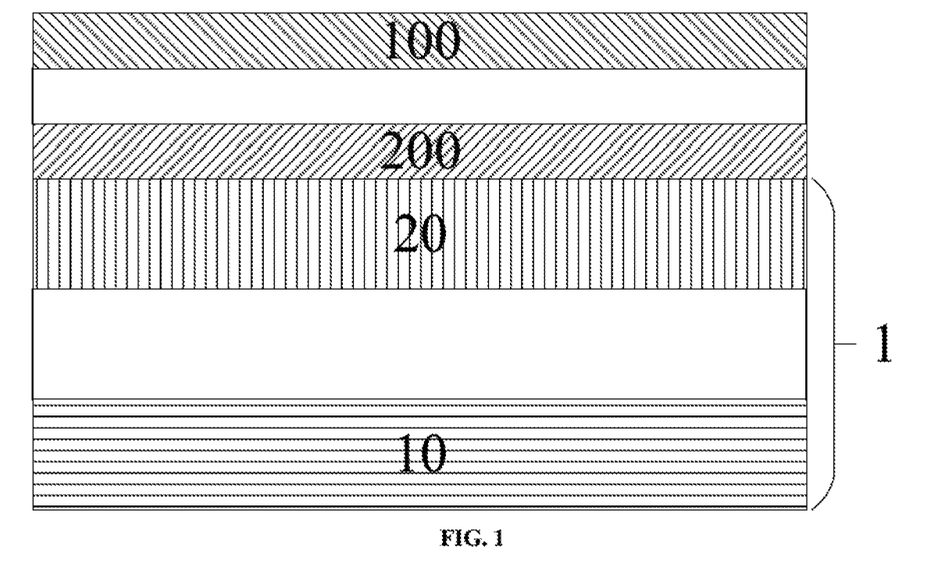
FIG. 1 is a schematic diagram of a display apparatus in some embodiments according to the present disclosure.

FIG. 1 is a schematic diagram of a display apparatus in some embodiments according to the present disclosure. Referring to FIG. 1, the display apparatus in some embodiments includes a display module 1, a first substantially transparent magnetic layer 100, and a second substantially transparent magnetic layer 200. The display module includes a first display substrate 10 and a second display substrate 20 facing the first display substrate 10. Optionally, the first substantially transparent magnetic layer 100 and the second substantially transparent magnetic layer 200 are spaced apart from each other. Both the first substantially transparent magnetic layer 100 and the second substantially transparent magnetic layer 200 are on a side of the second display substrate 20 distal to the first display substrate 10. The first substantially transparent magnetic layer 100 is on a side of the second substantially transparent magnetic layer 200 distal to the second display substrate 20. In some embodiments, the first substantially transparent magnetic layer 100 and the second substantially transparent magnetic layer 200 are configured to face each other with their sides having a same magnetic polarity to generate a mutually repulsive force between each other, e.g., at least on their neighboring sides. For example, there exists repulsive magnetic force between the first substantially transparent magnetic layer 100 and the second substantially transparent magnetic layer 200, e.g., between neighboring sides of the first substantially transparent magnetic layer 100 and the second substantially transparent magnetic layer 200.

In one example, the first substantially transparent magnetic layer 100 and the second substantially transparent magnetic layer 200 are configured to face each other with their sides having north polarity to generate a mutually repulsive force between each other, i.e., the neighboring sides of the first substantially transparent magnetic layer 100 and the second substantially transparent magnetic layer 200 are both sides having north polarity. In another example, the first substantially transparent magnetic layer 100 and the second substantially transparent magnetic layer 200 are configured to face each other with their sides having south polarity to generate a mutually repulsive force between each other, i.e., the neighboring sides of the first substantially transparent magnetic layer 100 and the second substantially transparent magnetic layer 200 are both sides having south polarity.

In the present display apparatus, the first substantially transparent magnetic layer 100 and the second substantially transparent magnetic layer 200 face each other with their sides having a same magnetic polarity to generate a mutually repulsive force between each other. Thus, the second substantially transparent magnetic layer 200 is configured to repel the first substantially transparent magnetic layer 100 when a pressure is applied on the first substantially transparent magnetic layer 100 along a direction from the first substantially transparent magnetic layer 100 toward the second substantially transparent magnetic layer 200. By having the first substantially transparent magnetic layer 100 and the second substantially transparent magnetic layer 200, deformation in the second display substrate caused by the pressure applied (directly or indirectly) on the first substantially transparent magnetic layer can be reduced or even eliminated.

Figure 2:
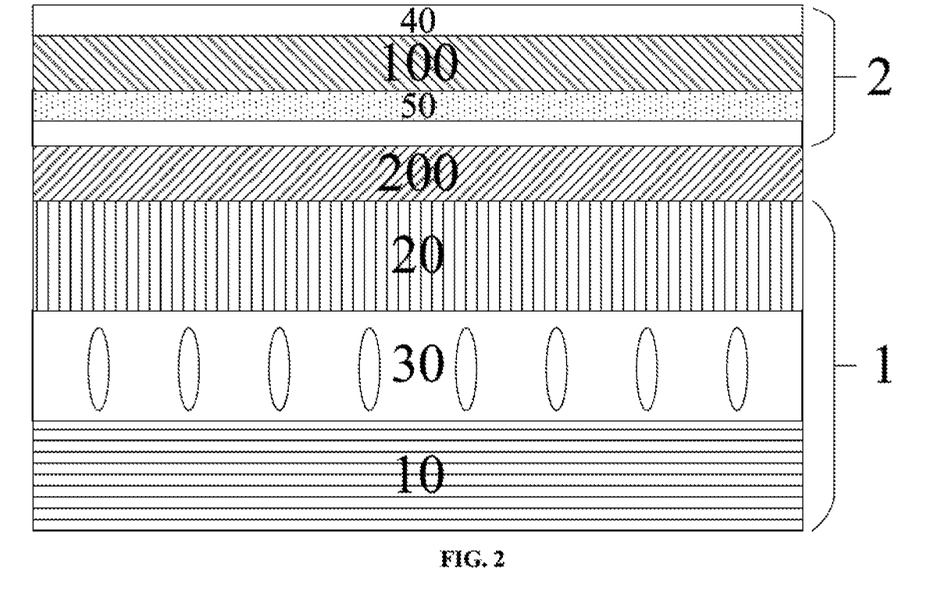
FIG. 2 is a schematic diagram of a display apparatus in some embodiments according to the present disclosure.

FIG. 2 is a schematic diagram of a display apparatus in some embodiments according to the present disclosure. Referring to FIG. 2, the display apparatus in some embodiments is a liquid crystal display apparatus. The display module 1 in some embodiments includes a first display substrate 10 (e.g., an array substrate having a plurality of thin film transistor for driving image display of the display module), and second display substrate 20 (e.g., a color filter substrate having a color filter), and a liquid crystal layer 30 between the first display substrate 10 and the second display substrate 20. By having the first substantially transparent magnetic layer 100 and the second substantially transparent magnetic layer 200 in the present display apparatus, the repulsive force between the first substantially transparent magnetic layer 100 and the second substantially transparent magnetic layer 200 prevents or significantly reduces the deformation in the second display substrate 20 caused by the pressure applied on the first substantially transparent magnetic layer 100. Because the deformation in the second display substrate 20 is reduced or eliminated, the pooling effects caused by the deformation in the second display substrate 20 are also reduced or eliminated in the present display apparatus.

Referring to FIG. 2, the display apparatus in some embodiments also includes a touch panel 2 on a side of the second display substrate 20 distal to the first display substrate 10. The touch panel 2 includes at least a touch electrode layer 50 on a base substrate 40, e.g., on a side of the base substrate 40 proximal to the display module 1. The second substantially transparent magnetic layer 200 is configured to repel the first substantially transparent magnetic layer 100 when a pressure is applied on the touch panel 2 along a direction from the touch panel 2 toward the display module 1, thereby reducing deformation in the second display substrate 20 due to the pressure applied on the touch panel 2.

In some embodiments, the first substantially transparent magnetic layer 100 and the second substantially transparent magnetic layer 200 are spaced apart by at least one layer of the touch panel 2. Referring to FIG. 2, the touch panel 2 in some embodiments includes a base substrate 40 and a touch electrode layer 50 on the base substrate 40. The first substantially transparent magnetic layer 100 is on the base substrate 40, the touch electrode layer 50 is on a side of the first substantially transparent magnetic layer 100 distal to the base substrate 40, and the second substantially transparent magnetic layer 200 is on a side of the touch electrode layer 50 distal to the first substantially transparent magnetic layer 100. Optionally, the first substantially transparent magnetic layer 100 and the second substantially transparent magnetic layer 200 are spaced apart by at least the touch electrode layer 50. The first substantially transparent magnetic layer 100 is on a side the touch electrode layer 50 proximal to the base substrate 40.

Figure 3:
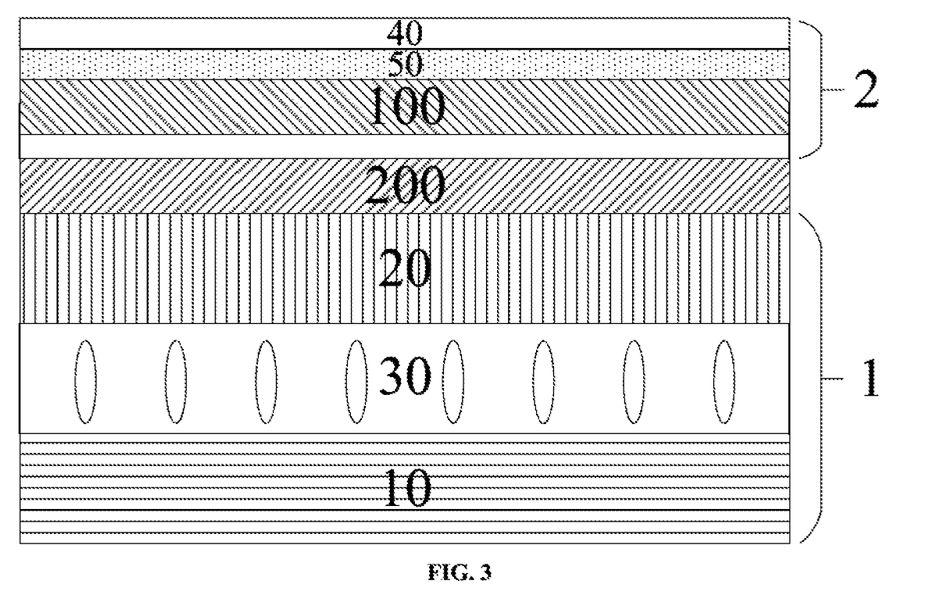
FIG. 3 is a schematic diagram of a display apparatus in some embodiments according to the present disclosure.

FIG. 3 is a schematic diagram of a display apparatus in some embodiments according to the present disclosure. Referring to FIG. 3, in some embodiments, the touch electrode layer 50 is on the base substrate 40, the first substantially transparent magnetic layer 100 is on a side of the touch electrode layer 50 distal to the base substrate 40, and the second substantially transparent magnetic layer 200 is on a side of the first substantially transparent magnetic layer 100 distal to the touch electrode layer 50.

Figure 4:
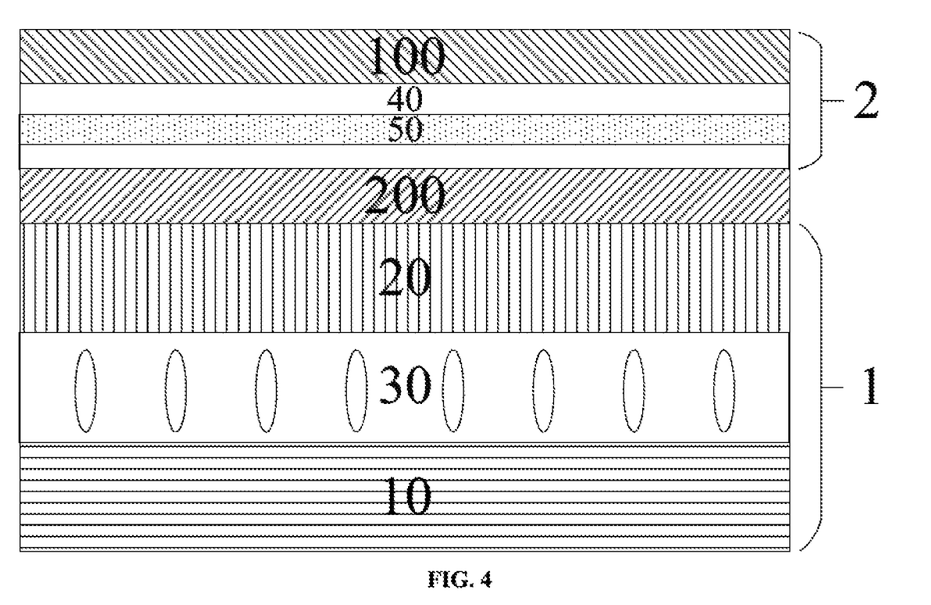
FIG. 4 is a schematic diagram of a display apparatus in some embodiments according to the present disclosure.

FIG. 4 is a schematic diagram of a display apparatus in some embodiments according to the present disclosure. Referring to FIG. 4, in some embodiments, the touch electrode layer 50 is on the base substrate 40, the second substantially transparent magnetic layer 200 is on a side of the touch electrode layer 50 distal to the base substrate 40, and the first substantially transparent magnetic layer 100 is on a side of the base substrate 40 distal to the touch electrode layer 50. The first substantially transparent magnetic layer 100 is on a side of the base substrate 40 distal to the second display substrate 20, and the second substantially transparent magnetic layer 200 is on a side of the second display substrate 20 proximal to the touch panel 2.

Various appropriate materials may be used to make the first substantially transparent magnetic layer 100 and the second substantially transparent magnetic layer 200. In some embodiments, at least one of the first substantially transparent magnetic layer 100 and the second substantially transparent magnetic layer 200 includes a magnetic material. Optionally, at least one of the first substantially transparent magnetic layer 100 and the second substantially transparent magnetic layer 200 is a substantially transparent magnetic layer having magnetic nano-particles dispersed in a substantially transparent insulating material matrix. In one example, the substantially transparent magnetic layer includes ferromagnetic nano-particles dispersed in a substantially transparent fluoride compound matrix. Optionally, the magnetic nano-particles have an average diameter in a range of approximately 10 nm to approximately 50 nm, e.g., approximately 10 nm to approximately 20 nm, approximately 20 nm to approximately 30 nm, approximately 30 nm to approximately 40 nm, and approximately 40 nm to approximately 50 nm. Optionally, the substantially transparent magnetic layer has a magnetization of at least 10 kA/m, e.g., at least 12 kA/m, at least 14 kA/m, at least 16 kA/m, and at least 18 kA/m. Optionally, the substantially transparent magnetic layer has a transmittance for visible light greater than 50%, e.g., greater than 60%, greater than 70%, greater than 80%, greater than 90%, greater than 95%, and greater than 98%.

In some embodiments, the substantially transparent magnetic layer includes a plurality of nano-particles such as nanometer-sized granules dispersed in a substantially transparent matrix. Various appropriate transparent materials may be used for making the matrix. Optionally, the matrix is made of an insulating material. Optionally, the matrix includes a metal fluoride compound. Examples of metal fluoride compounds suitable for making the matrix include aluminum fluoride, magnesium fluoride, and barium fluoride. Optionally, the nano-particles are ferromagnetic nano-particles.

In some embodiments, the nano-particles such as nanometer-sized granules include one or a combination of gadolinium, iron, cobalt, nickel, dysprosium, dysprosium oxide, platinum, palladium, cobalt based alloys (e.g., iron-cobalt alloy), iron based alloys (e.g., iron-cobalt alloy), nickel based alloys (e.g., iron-nickel alloy), stainless steel or other paramagnetic or ferromagnetic metals, gadolinium salts, gadolinium complexes, Gd-DTPA (gadolinium diethylenetriaminepentacetic acid), gadopentetate dimeglumine, compounds of copper, nickel, manganese, chromium, dysprosium and gadolinium, and chelates of gadolinium and other paramagnetic metals such as iron or manganese. Optionally, the nano-particles such as nanometer-sized granules include an alloy including one or a combination of iron and cobalt, e.g., an iron-cobalt alloy.

Optionally, the substantially transparent magnetic layer is a $Fe_{13}Co_{10}Al_{22}F_{55}$ film. Optionally, the substantially transparent magnetic layer is a $Fe_9Co_5Al_{19}F_{67}$ film.

In some embodiments, the substantially transparent magnetic layer is a diluted magnetic semiconductor film, which is formed from a dopant and a substance to be doped through a chemical reaction deposition. Optionally, the dopant may be one or more of acetylacetonates having magnetic transition group metal element(s), and the magnetic transition group metal element(s) includes one or more of Fe, Co, Ni, and Mn. Optionally, the substance to be doped may be one or more of acetylacetonates having nonmagnetic transition group metal element(s). Optionally, the nonmagnetic transition group metal elements) includes one or more of Zn, Zr, Ti, and Ga. The molecular formula of the acetylacetonate may be $(C_xH_yO_z)$ X, in which X is one or a combination of iron, cobalt, nickel, manganese, zinc, zirconium, titanium, and gallium. In one example, the acetylacetonate is zinc acetylacetonate ($C_{10}H_{14}O_4Zn$) or manganese acetylacetonate ($C_{15}H_{21}O_6Mn$).

FIGS. 2 to 4 illustrate several exemplary display apparatuses in which the touch panel is attached on the surface of the display module. In some embodiments, the first substantially transparent magnetic layer 100 and the second substantially transparent magnetic layer 200 can be implemented in a display apparatus that is not a touch control display apparatus, e.g., to prevent the pooling effects when the surface of the display apparatus is touch upon. Optionally, the display apparatus is an in-cell touch control display apparatus. Optionally, the display apparatus is an on-cell touch control display apparatus. Optionally, the display apparatus is an add-on type touch control display apparatus. Optionally, the display apparatus is one-glass-solution type touch control display apparatus.

Examples of appropriate display apparatuses include, but are not limited to, an electronic paper, a mobile phone, a tablet computer, a television, a monitor, a notebook computer, a digital album, a GPS, etc.

Optionally, the display apparatus is a liquid crystal display apparatus. Optionally, the display apparatus is an organic light emitting diode display apparatus.

In some embodiments, the display apparatus further includes a third magnetic layer and a fourth magnetic layer spaced apart from each other. The third magnetic layer is on the first display substrate of the display module, and the fourth magnetic layer is on the second display substrate of the display module. The third magnetic layer and the fourth magnetic layer are configured to face each other with their sides having a same magnetic polarity to generate a mutually repulsive force between each other. Optionally, the second substantially transparent magnetic layer and the fourth magnetic layer are configured to face each other with their sides having a same magnetic polarity to generate a mutually repulsive force between each other. Optionally, the second substantially transparent magnetic layer and the fourth magnetic layer are configured to face each other with their sides having opposite magnetic polarities to generate a mutually attractive force between each other.

Figure 5:
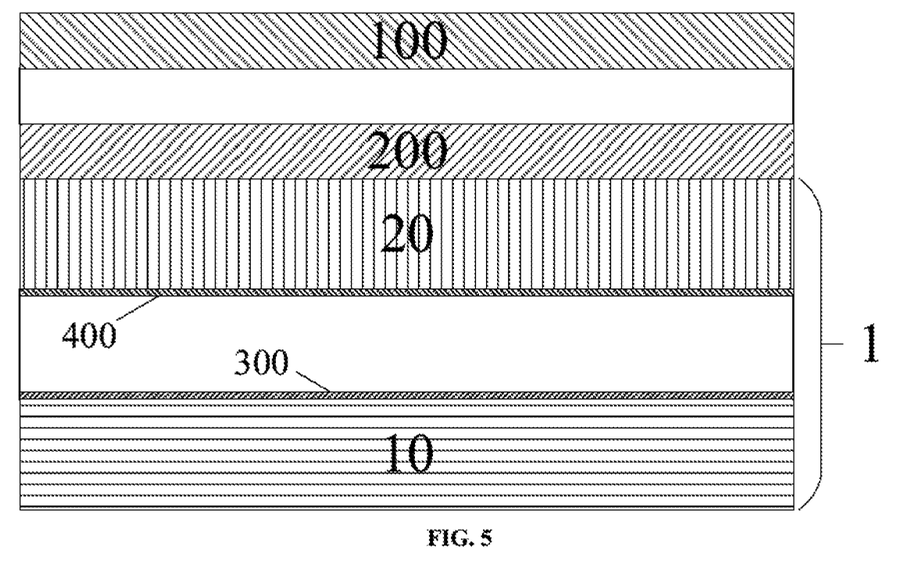
FIG. 5 is a schematic diagram of a display apparatus in some embodiments according to the present disclosure.

FIG. 5 is a schematic diagram of a display apparatus in some embodiments according to the present disclosure. Referring to FIG. 5, the display apparatus in some embodiments includes a display module 1 having a first display substrate 10 (e.g., an array substrate having a plurality of thin film transistor for driving image display of the display module), and a second display substrate 20 (e.g., a color filter substrate having a color filter) facing the first display substrate 10. The display apparatus further includes a third magnetic layer 300 and a fourth magnetic layer 400 spaced apart from each other. The third magnetic layer 300 is on the first display substrate 10 of the display module 1, and the fourth magnetic layer 400 is on the second display substrate 20 of the display module 1. The third magnetic layer 300 and the fourth magnetic layer 400 are configured to face each other with their sides having a same magnetic polarity to generate a mutually repulsive force between each other. Optionally, the second substantially transparent magnetic layer 200 and the fourth magnetic layer 400 are configured to face each other with their sides having a same magnetic polarity to generate a mutually repulsive force between each other. Optionally, the second substantially transparent magnetic layer 200 and the fourth magnetic layer 400 are configured to face each other with their sides having opposite magnetic polarities to generate a mutually attractive force between each other. Optionally, the third magnetic layer 300 and the fourth magnetic layer 400 are disposed inside the display module 1. For example, the third magnetic layer 300 is on a side of the first display substrate 10 proximal to the second display substrate 20; and the fourth magnetic layer 400 is on a side of the second display substrate 20 proximal to the first display substrate 10. By having the third magnetic layer 300 and the fourth magnetic layer 400, the deformation in the second display substrate 20 caused by the pressure applied on the first substantially transparent magnetic layer 100 can be further reduced. Because the deformation in the second display substrate 20 is reduced or eliminated, the pooling effects caused by the deformation in the second display substrate 20 are also reduced or eliminated in the present display apparatus.

Figure 6:
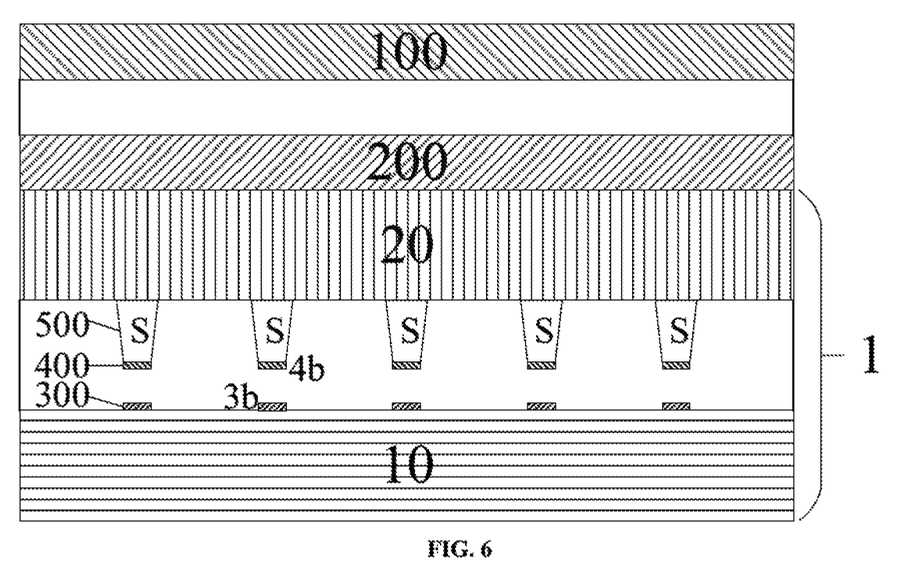
FIG. 6 is a schematic diagram of a display apparatus in some embodiments according to the present disclosure.

FIG. 6 is a schematic diagram of a display apparatus in some embodiments according to the present disclosure. Referring to FIG. 6, the display apparatus in some embodiments includes a display module 1 having a first display substrate 10 (e.g., an array substrate having a plurality of thin film transistor for driving image display of the display module), and a second display substrate 20 (e.g., a color filter substrate having a color filter) facing the first display substrate 10. The display module 1 further includes a spacer layer 500 between the first display substrate 10 and the second display substrate 20 spacing apart the first display substrate 10 and the second display substrate 20. In some embodiments, the spacer layer 500 includes at least a plurality of subsidiary spacers S in contact with only one of the first display, substrate 10 and the second display substrate 20, but not both. For example, the plurality of subsidiary spacers S in FIG. 6 are in contact with the second display substrate 20 but not in contact with the first display substrate 10.

In some embodiments, the display apparatus further includes a third magnetic layer 300 and a fourth magnetic layer 400 spaced apart from each other. The fourth magnetic layer 400 is on a side of the spacer layer 500 distal to the second display substrate 20 and proximal to the first display substrate 10. The third magnetic layer 300 is on a side of the first display substrate 10 proximal to the second display substrate 20. The third magnetic layer 300 and the fourth magnetic layer 400 are configured to face each other with their sides having a same magnetic polarity to generate a mutually repulsive force between each other. Optionally, the second substantially transparent magnetic layer 200 and the fourth magnetic layer 400 are configured to face each other with their sides having a same magnetic polarity to generate a mutually repulsive force between each other. Optionally, the second substantially transparent magnetic layer 200 and the fourth magnetic layer 400 are configured to face each other with their sides having opposite magnetic polarities to generate a mutually attractive force between each other. Optionally, the fourth magnetic layer 400 includes a plurality of fourth magnetic blocks 4b, each of which on a side of one of the plurality of subsidiary spacers S distal to the second display substrate 20 and proximal to the first display substrate 10. Optionally, the third magnetic layer 300 includes a plurality of third magnetic blocks 3b, each of which facing one of the plurality of fourth magnetic blocks 4b. Each pair of one of the plurality of third magnetic blocks 3b and one of the plurality of fourth magnetic blocks 4b are configured to face each other with their sides having a same magnetic polarity to generate a mutually repulsive force between each other. By having the third magnetic layer 300 and the fourth magnetic layer 400, the deformation in the second display substrate 20 caused by the pressure applied on the first substantially transparent magnetic layer 100 can be further reduced. Because the deformation in the second display substrate 20 is reduced or eliminated, the pooling effects caused by the deformation in the second display substrate 20 are also reduced or eliminated in the present display apparatus.

Figure 7:
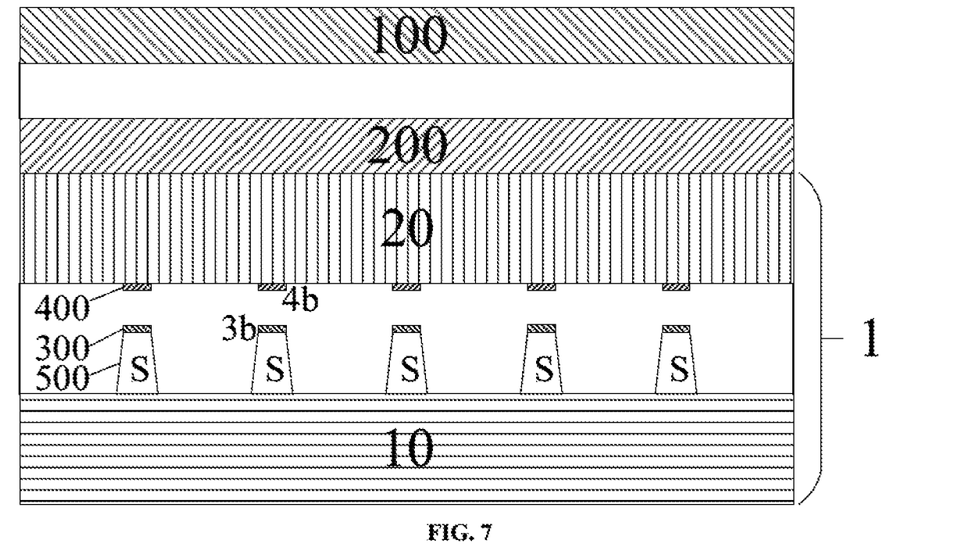
FIG. 7 is a schematic diagram of a display apparatus in some embodiments according to the present disclosure.

FIG. 7 is a schematic diagram of a display apparatus in some embodiments according to the present disclosure. Referring to FIG. 7, the display apparatus in some embodiments includes a display module 1 having a first display substrate 10 (e.g., an array substrate having a plurality of thin film transistor for driving image display of the display module), and a second display substrate 20 (e.g., a color filter substrate having a color filter) facing the first display substrate 10. The display module 1 further includes a spacer layer 500 between the first display substrate 10 and the second display substrate 20 spacing apart the first display substrate 10 and the second display substrate 20. In FIG. 7, the plurality of subsidiary spacers S in FIG. 5 are in contact with the first display substrate 10 but not in contact with the second display substrate 20.

In some embodiments, the display apparatus further includes a third magnetic layer 300 and a fourth magnetic layer 400 spaced apart from each other. The third magnetic layer 300 is on a side of the spacer layer 500 distal to the first display substrate 10 and proximal to the second display substrate 20. The fourth magnetic layer 400 is on a side of the second display substrate 20 proximal to the first display substrate 10. The third magnetic layer 300 and the fourth magnetic layer 400 are configured to face each other with their sides having a same magnetic polarity to generate a mutually repulsive force between each other. Optionally, the second substantially transparent magnetic layer 200 and the fourth magnetic layer 400 are configured to face each other with their sides having a same magnetic polarity to generate a mutually repulsive force between each other. Optionally, the second substantially transparent magnetic layer 200 and the fourth magnetic layer 400 are configured to face each other with their sides having opposite magnetic polarities to generate a mutually attractive force between each other. Optionally, the third magnetic layer 300 includes a plurality of third magnetic blocks 3b, each of which on a side of one of the plurality of subsidiary spacers S distal to the first display substrate 10 and proximal to the second display substrate 20. Optionally, the fourth magnetic layer 400 includes a plurality of fourth magnetic blocks 4b, each of which facing one of the plurality of third magnetic blocks 3b. Each pair of one of the plurality of third magnetic blocks 3b and one of the plurality of fourth magnetic blocks 4h are configured to face each other with their sides having a same magnetic polarity to generate a mutually repulsive force between each other. By having the third magnetic layer 300 and the fourth magnetic layer 400, the deformation in the second display substrate 20 caused by the pressure applied on the first substantially transparent magnetic layer 100 can be further reduced. Because the deformation in the second display substrate 20 is reduced or eliminated, the pooling effects caused by the deformation in the second display substrate 20 are also reduced or eliminated in the present display apparatus.

Figure 8:
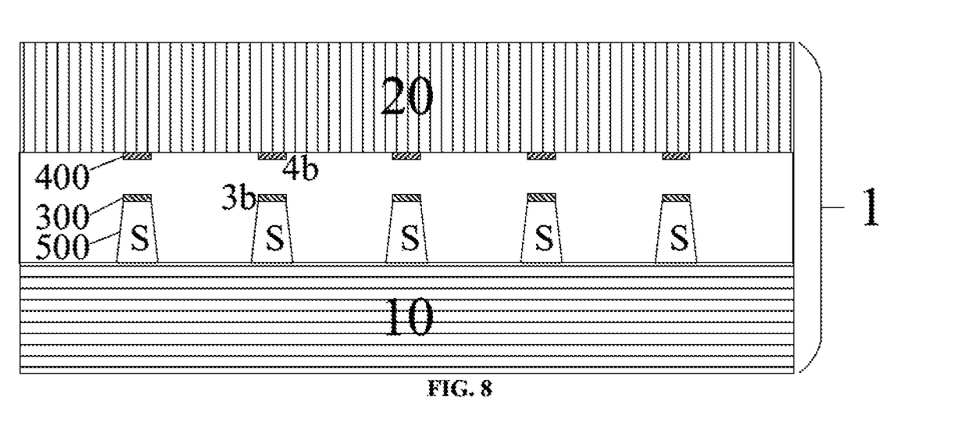
FIG. 8 is a schematic diagram of a display apparatus in some embodiments according to the present disclosure.

FIG. 8 is a schematic diagram of a display apparatus in some embodiments according to the present disclosure. Referring to FIG. 8, the display apparatus in some embodiments includes a display module 1 having a first display substrate 10, and a second display substrate 20 facing the first display substrate 10, and a spacer layer 500 spacing apart the first display substrate 10 and the second display substrate 20. In some embodiments, the display apparatus further includes a third magnetic layer 300 and a fourth magnetic layer 400 spaced apart from each other. The third magnetic layer 300 is on a side of the spacer layer 500 distal to the first display substrate 10 and proximal to the second display substrate 20. The fourth magnetic layer 400 is on a side of the second display substrate 20 proximal to the first display substrate 10. The third magnetic layer 300 and the fourth magnetic layer 400 are configured to face each other with their sides having a same magnetic polarity to generate a mutually repulsive force between each other. Optionally, the third magnetic layer 300 includes a plurality of third magnetic blocks 3b, each of which on a side of one of the plurality of subsidiary spacers S distal to the first display substrate 10 and proximal to the second display substrate 20. Optionally, the fourth magnetic layer 400 includes a plurality of fourth magnetic blocks 4b, each of which facing one of the plurality of third magnetic blocks 3b. Each pair of one of the plurality of third magnetic blocks 3b and one of the plurality of fourth magnetic blocks 4b are configured to face each other with their sides having a same magnetic polarity to generate a mutually repulsive force between each other.

In another aspect, the present disclosure provides a method of fabricating a display apparatus. In some embodiments, the method includes forming display module, forming a first substantially transparent magnetic layer, and forming a second substantially transparent magnetic layer. Optionally, the step of forming the display module include forming a first display substrate, and forming a second display substrate facing the first display substrate. Optionally, both of the first substantially transparent magnetic layer and the second substantially transparent magnetic layer are formed on a side of the second display substrate distal to the first display substrate and formed to be spaced apart from each other. Optionally, the first substantially transparent magnetic layer and the second substantially transparent magnetic layer are formed to face each other with their sides having a same magnetic polarity to generate a mutually repulsive force between each other. Optionally, the first substantially transparent magnetic layer is formed on a side of the second substantially transparent magnetic layer distal to the second display substrate.

In some embodiments, the first substantially transparent magnetic layer and the second substantially transparent magnetic layer are formed to be spaced apart by a distance such that the second substantially transparent magnetic layer repels the first substantially transparent magnetic layer when a pressure is applied on the first substantially transparent magnetic layer along a direction from the first substantially transparent magnetic layer toward the second substantially transparent magnetic layer. Optionally, the repulsive three between the first substantially transparent magnetic layer and the second substantially transparent magnetic layer are sufficiently large to reduce or eliminate deformation in the second display substrate due to the pressure applied on the first substantially transparent magnetic layer.

In some embodiments, the method further includes forming a touch panel on a side of the second display substrate distal to the first display substrate. Optionally, the first substantially transparent magnetic layer and the second substantially transparent magnetic layer are formed to be spaced apart by a distance such that the second substantially transparent magnetic layer repels the first substantially transparent magnetic layer when a pressure is applied on the touch panel along a direction from the touch panel toward the display module, thereby reducing deformation in the second display substrate due to the pressure applied on the touch panel.

In some embodiments, the first substantially transparent magnetic layer and the second substantially transparent magnetic layer are formed to be spaced apart by at least one layer (e.g., a touch electrode layer) of the touch panel. Optionally, the first substantially transparent magnetic layer and the second substantially transparent magnetic layer are formed not to be spaced apart by any layer of the touch panel.

In some embodiments, the method includes forming a first substantially transparent magnetic layer having a first side having a first magnetic polarity and a second side having a second magnetic polarity; forming a second substantially transparent magnetic layer having a first side having the first magnetic polarity and a second side having the second magnetic polarity. Optionally, the display apparatus is formed so that the first side of the first substantially transparent magnetic layer and the first side of the second substantially transparent magnetic layer are configured to face each other. Optionally, the display apparatus is formed so that the second side of the first substantially transparent magnetic layer and the second side of the second substantially transparent magnetic layer are configured to face each other.

In some embodiments, the method includes forming the first substantially transparent magnetic layer on the touch panel, and forming the second substantially transparent magnetic layer on the display module. Optionally, the method further includes attaching the touch panel to the display module so that the first substantially transparent magnetic layer and the second substantially transparent magnetic layer are configured to face each other with their sides having a same magnetic polarity. Optionally, the step of attaching the touch panel to the display module is performed so that the first side of the first substantially transparent magnetic layer and the first side of the second substantially transparent magnetic layer are configured to face each other. Optionally, the step of attaching the touch panel to the display module is performed so that the second side of the first substantially transparent magnetic layer and the second side of the second substantially transparent magnetic layer are configured to face each other.

In some embodiments, the touch electrode layer of the touch panel is formed on a base substrate. Optionally, the first substantially transparent magnetic layer is formed on a side of the base substrate proximal to the second display substrate. Optionally, the second substantially transparent magnetic layer is formed on a side of the second display substrate proximal to the touch panel. Optionally, the first substantially transparent magnetic layer is formed on a side the touch electrode layer proximal to the base substrate. Optionally, the first substantially transparent magnetic layer is on a side the touch electrode layer distal to the base substrate. Optionally, the first substantially transparent magnetic layer is on a side of the base substrate distal to the second display substrate, Optionally, the second substantially transparent magnetic layer is on a side of the second display substrate proximal to the touch panel. Optionally, the first substantially transparent magnetic layer is on a side of the base substrate distal to the second display substrate, and the second substantially transparent magnetic layer is on a side of the second display substrate proximal to the touch panel.

In some embodiments, the substantially transparent magnetic layer is formed using a magneton sputtering process. Optionally, the step of forming the first substantially transparent magnetic layer includes magneton sputtering a magnetic material on the base substrate of the touch panel.

Optionally, the step of forming the second substantially transparent magnetic layer includes magneton sputtering a magnetic material on a surface of the second display substrate on a side distal to the first display substrate.

In some embodiments, the display apparatus is a liquid crystal display apparatus, and the step of forming the display module further includes forming a liquid crystal layer between the first display substrate and the second display substrate.

Optionally, at least one of the first substantially transparent magnetic layer and the second substantially transparent magnetic layer is a substantially transparent magnetic layer formed using magnetic nano-particles dispersed in a substantially transparent insulating material matrix.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
a display module comprising a first display substrate and a second display substrate facing the first display substrate;
a touch panel on a side of the second display substrate distal to the first display substrate; and
a first substantially transparent magnetic layer and a second substantially transparent magnetic layer both of which on a side of the second display substrate distal to the first display substrate and spaced apart from each other;
wherein the first substantially transparent magnetic layer is on a side of the second substantially transparent magnetic layer distal to the second display substrate; and
the first substantially transparent magnetic layer and the second substantially transparent magnetic layer are configured to face each other with their sides having a same magnetic polarity to generate a mutually repulsive force between each other;
wherein the touch panel comprises a base substrate;
the first substantially transparent magnetic layer is on a side of the base substrate proximal to the second display substrate; and
the second substantially transparent magnetic layer is on the side of the second display substrate proximal to the touch panel.

2. The display apparatus of claim 1, wherein the second substantially transparent magnetic layer is configured to repel the first substantially transparent magnetic layer when a pressure is applied on the first substantially transparent magnetic layer along a direction from the first substantially transparent magnetic layer toward the second substantially transparent magnetic layer, thereby reducing deformation in the second display substrate due to the pressure applied on the first substantially transparent magnetic layer.

3. The display apparatus of claim 1, wherein the second substantially transparent magnetic layer is configured to repel the first substantially transparent magnetic layer when a pressure is applied on the touch panel along a direction from the touch panel toward the display module, thereby reducing deformation in the second display substrate due to the pressure applied on the touch panel.

4. The display apparatus of claim 1, wherein the first substantially transparent magnetic layer and the second substantially transparent magnetic layer are spaced apart by at least one layer of the touch panel.

5. The display apparatus of claim 1, wherein the touch panel further comprises a touch electrode layer on the base substrate; and
the first substantially transparent magnetic layer is on a side the touch electrode layer proximal to the base substrate.

6. The display apparatus of claim 1, wherein the touch panel further comprises a touch electrode layer on the base substrate; and
the first substantially transparent magnetic layer is on a side the touch electrode layer distal to the base substrate.

7. The display apparatus of claim 1, wherein at least one of the first substantially transparent magnetic layer and the second substantially transparent magnetic layer is a substantially transparent magnetic layer comprising magnetic nano-particles dispersed in a substantially transparent insulating material matrix.

8. The display apparatus of claim 7, wherein the substantially transparent magnetic layer comprises ferromagnetic nano-particles dispersed in a substantially transparent fluoride compound matrix.

9. The display apparatus of claim 8, wherein the ferromagnetic nano-particles comprise an iron-cobalt alloy of nanometer-sized granules.

10. The display apparatus of claim 8, wherein the transparent insulating material matrix comprises aluminum fluoride.

11. The display apparatus of claim 7, wherein the magnetic nano-particles have an average diameter in a range of approximately 10 nm to approximately 20 nm.

12. The display apparatus of claim 7, wherein magnetization of the substantially transparent magnetic layer is at least 15 kA/m.

13. The display apparatus of claim 7, wherein the substantially transparent magnetic layer has a transmittance for visible light greater than 80%.

14. The display apparatus of claim 1, further comprising:
a third magnetic layer on a side of the first display substrate proximal to the second display substrate; and
a fourth magnetic layer on a side of the second display substrate proximal to the first display substrate, and spaced apart from the third magnetic layer;
wherein the third magnetic layer and the fourth magnetic layer are configured to face each other with their sides having a same magnetic polarity to generate a mutually repulsive force between each other.

15. The display apparatus of claim 14, wherein the display module further comprises a spacer layer spacing apart the first display substrate and the second display substrate;
the spacer layer comprises a plurality of subsidiary spacers;
the third magnetic layer is on a side of the first display substrate proximal to the second display substrate; and
the fourth magnetic layer is on a side of the plurality of subsidiary spacers distal to the second display substrate and proximal to the first display substrate.

16. The display apparatus of claim 14, wherein the display module further comprises a spacer layer spacing apart the first display substrate and the second display substrate;
the spacer layer comprises a plurality of subsidiary spacers;
the third magnetic layer is on a side of the plurality of subsidiary spacers distal to the first display substrate and proximal to the second display substrate; and
the fourth magnetic layer is on a side of the second display substrate proximal to the first display substrate.

* * * * *